US011483095B2

(12) United States Patent
Chendamarai Kannan et al.

(10) Patent No.: US 11,483,095 B2
(45) Date of Patent: Oct. 25, 2022

(54) TIME VARYING CODE BLOCK GROUP GRANULARITY FOR HYBRID AUTOMATIC RECEIPT REQUEST PROCESSES IN NEW RADIO-UNLICENSED OPERATIONS

(71) Applicant: QUALCOMM incorporated, San Diego, CA (US)

(72) Inventors: Arumugam Chendamarai Kannan, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 225 days.

(21) Appl. No.: 16/590,082

(22) Filed: Oct. 1, 2019

(65) Prior Publication Data

US 2020/0106554 A1 Apr. 2, 2020

Related U.S. Application Data

(60) Provisional application No. 62/740,225, filed on Oct. 2, 2018.

(51) Int. Cl.
*H04L 1/00* (2006.01)
*H04L 1/18* (2006.01)
(Continued)

(52) U.S. Cl.
CPC .......... *H04L 1/0057* (2013.01); *H04L 1/1812* (2013.01); *H04L 1/1893* (2013.01);
(Continued)

(58) Field of Classification Search
None
See application file for complete search history.

(56) References Cited

U.S. PATENT DOCUMENTS

2009/0276675 A1* 11/2009 Ojala ................... H04L 1/1819
714/749
2018/0278368 A1 9/2018 Kim et al.
(Continued)

FOREIGN PATENT DOCUMENTS

WO WO-2018082506 A1 5/2018

OTHER PUBLICATIONS

Author Unknown, Text proposal for DLUL data scheduling and HARQ procedure, Doc. No. R1-1810973, pp. 1-8, Sep. 29 (Year: 2018).*

(Continued)

*Primary Examiner* — Christopher M Crutchfield
(74) *Attorney, Agent, or Firm* — Liem T. Do

(57) ABSTRACT

Hybrid automatic repeat request (HARQ) configurability on new radio (NR) unlicensed (NR-U) operations is disclosed. Time varying code block group (CBG) granularity may be defined by signaling a set of available CBG granularities to a user equipment (UE) for HARQ feedback. The UE monitors for control signaling that may be used to select the CBG granularity for the current slot. The UE may then perform HARQ feedback according to a format corresponding to the selected CBG granularity. Additional aspects disclose updating a contention window size (CWS) in NR-U operations considering the varying CBG granularity. A base station may compute an effective HARQ feedback value that accounts for the varied CBG granularity corresponding to transmissions at a configurable reference slot of set of slots. The base station will update the CWS depending on the relationship of the failure rate of the effective HARQ feedback and a transmission failure rate threshold.

20 Claims, 11 Drawing Sheets

(51) Int. Cl.
*H04W 74/08* (2009.01)
*H04L 5/00* (2006.01)
*H04W 84/04* (2009.01)

(52) U.S. Cl.
CPC ....... *H04L 5/0094* (2013.01); *H04W 74/0808* (2013.01); *H04W 84/042* (2013.01)

(56) References Cited

U.S. PATENT DOCUMENTS

| | | | |
|---|---|---|---|
| 2018/0324830 A1* | 11/2018 | Islam | H04W 72/1236 |
| 2018/0367245 A1* | 12/2018 | Soriaga | H04L 1/0041 |
| 2019/0081737 A1* | 3/2019 | Huang | H04B 7/0456 |
| 2019/0149271 A1* | 5/2019 | Yin | H04L 1/1816 370/329 |
| 2019/0207734 A1 | 7/2019 | Yang et al. | |
| 2020/0028618 A1* | 1/2020 | Peng | H04L 5/0007 |
| 2020/0059341 A1* | 2/2020 | Zhang | H04L 5/0007 |
| 2021/0006378 A1* | 1/2021 | Lei | H04L 1/1861 |
| 2021/0075558 A1* | 3/2021 | Takeda | H04W 72/0446 |

OTHER PUBLICATIONS

International Search Report and Written Opinion—PCT/US2019/054278—ISA/EPO—dated Mar. 18, 2020.

LG Electronics: "Discussion on CB Group Based HARQ Operation," 3GPP Draft; R1-1704916 NR CBG HARQ_Final, 3rd Generation Partnership Project (3GPP), Mobile Competence Centre; 650, Route Des Lucioles; F-06921 Sophia-Antipolis Cedex; France, vol. RAN WG1, No. Spokane, USA; Apr. 3, 2017-Apr. 7, 2017, Apr. 2, 2017, XP051243051,4 pages, Retrieved from the Internet: URL: http://www.3gpp.org/ftp/Meetings_3GPP_SYNC/RAN1/Docs/ [retrieved on Apr. 2, 2017] the whole document.

Partial International Search Report—PCT/US2019/054278—ISA/EPO—dated Jan. 17, 2020.

* cited by examiner

TIME VARYING CODE BLOCK GROUP GRANULARITY FOR HYBRID AUTOMATIC RECEIPT REQUEST PROCESSES IN NEW RADIO-UNLICENSED OPERATIONS

CROSS-REFERENCE TO RELATED APPLICATIONS

This application claims the benefit of U.S. Provisional Patent Application No. 62/740,225, entitled, "TIME VARYING CBG GRANULARITY FOR HARQ PROCESSES IN NR-U OPERATIONS," filed on Oct. 2, 2018, which is expressly incorporated by reference herein in its entirety.

BACKGROUND

Field

Aspects of the present disclosure relate generally to wireless communication systems, and more particularly, to time varying code block group (CBG) granularity for hybrid automatic repeat request (HARQ) processes in new radio (NR) unlicensed (NR-U) operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a user equipment (UE), a semi-static configuration signal, wherein the semi-static configuration signal configures a plurality of available code block group (CBG) granularities for acknowledgement feedback, monitoring, by the UE, for control signaling from a serving base station, wherein the control signaling is associated with a slot type of a current slot of a current transmission opportunity (TxOP), selecting, by the UE in response to detection of the control signaling, a current CBG granularity from the plurality of available CBG granularities for the current slot of the current TxOP, wherein the selecting is based on the control signaling, and performing, by the UE, the acknowledgement feedback for the current slot according to an acknowledgement format corresponding to the current CBG granularity.

In an additional aspect of the disclosure, a method of wireless communication includes transmitting, by a base station, a semi-static configuration signal to one or more served UEs, wherein the semi-static configuration signal configures a plurality of available CBG granularities for acknowledgement feedback, transmitting, by the base station, control signaling to the one or more served UEs, wherein the control signaling is associated with a slot type of a current slot of a current TxOP, and detecting, by the base station, acknowledgement feedback from the one or more served UEs, wherein the acknowledgement feedback is detected in an acknowledgement format corresponding to the current CBG granularity.

In an additional aspect of the disclosure, a method of wireless communication includes computing, by a base station, an effective set of acknowledgement values based on one or more acknowledgement values received corresponding to data transmissions in a reference slot of a current TxOP, determining, by the base station, a transmission failure rate of the effective set of acknowledgement values, and updating, by the base station, a contention window size in response to a relative association between the transmission failure rate and a transmission failure threshold rate.

In an additional aspect of the disclosure, an apparatus configured for wireless communication includes means for receiving, by a UE, a semi-static configuration signal, wherein the semi-static configuration signal configures a plurality of available CBG granularities for acknowledgement feedback, means for monitoring, by the UE, for control signaling from a serving base station, wherein the control signaling is associated with a slot type of a current slot of a current TxOP, means for selecting, by the UE in response to detection of the control signaling, a current CBG granularity from the plurality of available CBG granularities for the current slot of the current TxOP, wherein the means for selecting is executed based on the control signaling, and means for performing, by the UE, the acknowledgement feedback for the current slot according to an acknowledgement format corresponding to the current CBG granularity.

In an additional aspect of the disclosure, an apparatus configured for wireless communication includes means for transmitting, by a base station, a semi-static configuration signal to one or more served UEs, wherein the semi-static configuration signal configures a plurality of available CBG granularities for acknowledgement feedback, means for transmitting, by the base station, control signaling to the one or more served UEs, wherein the control signaling is associated with a slot type of a current slot of a current TxOP, and means for detecting, by the base station, acknowledgement feedback from the one or more served UEs, wherein the acknowledgement feedback is detected in an acknowledgement format corresponding to the current CBG granularity.

In an additional aspect of the disclosure, an apparatus configured for wireless communication includes means for computing, by a base station, an effective set of acknowledgement values based on one or more acknowledgement values received corresponding to data transmissions in a reference slot of a current TxOP, means for determining, by the base station, a transmission failure rate of the effective set of acknowledgement values, and means for updating, by the base station, a contention window size in response to a relative association between the transmission failure rate and a transmission failure threshold rate.

In an additional aspect of the disclosure, a non-transitory computer-readable medium having program code recorded thereon. The program code further includes code to receive, by a UE, a semi-static configuration signal, wherein the semi-static configuration signal configures a plurality of available CBG granularities for acknowledgement feedback, code to monitor, by the UE, for control signaling from a serving base station, wherein the control signaling is associated with a slot type of a current slot of a current TxOP, code to select, by the UE in response to detection of the control signaling, a current CBG granularity from the plurality of available CBG granularities for the current slot of the current TxOP, wherein the code to select is executed based on the control signaling, and code to perform, by the UE, the acknowledgement feedback for the current slot according to an acknowledgement format corresponding to the current CBG granularity.

In an additional aspect of the disclosure, a non-transitory computer-readable medium having program code recorded thereon. The program code further includes code to transmit, by a base station, a semi-static configuration signal to one or more served UEs, wherein the semi-static configuration signal configures a plurality of available CBG granularities for acknowledgement feedback, code to transmit, by the base station, control signaling to the one or more served UEs, wherein the control signaling is associated with a slot type of a current slot of a current TxOP, and code to detect, by the base station, acknowledgement feedback from the one or more served UEs, wherein the acknowledgement feedback is detected in an acknowledgement format corresponding to the current CBG granularity.

In an additional aspect of the disclosure, a non-transitory computer-readable medium having program code recorded thereon. The program code further includes code to compute, by a base station, an effective set of acknowledgement values based on one or more acknowledgement values received corresponding to data transmissions in a reference slot of a current TxOP, code to determine, by the base station, a transmission failure rate of the effective set of acknowledgement values, and code to update, by the base station, a contention window size in response to a relative association between the transmission failure rate and a transmission failure threshold rate.

In an additional aspect of the disclosure, an apparatus configured for wireless communication is disclosed. The apparatus includes at least one processor, and a memory coupled to the processor. The processor is configured to receive, by a UE, a semi-static configuration signal, wherein the semi-static configuration signal configures a plurality of available CBG granularities for acknowledgement feedback, to monitor, by the UE, for control signaling from a serving base station, wherein the control signaling is associated with a slot type of a current slot of a current TxOP, to select, by the UE in response to detection of the control signaling, a current CBG granularity from the plurality of available CBG granularities for the current slot of the current TxOP, wherein the configuration to select is executed based on the control signaling, and to perform, by the UE, the acknowledgement feedback for the current slot according to an acknowledgement format corresponding to the current CBG granularity.

In an additional aspect of the disclosure, an apparatus configured for wireless communication is disclosed. The apparatus includes at least one processor, and a memory coupled to the processor. The processor is configured to transmit, by a base station, a semi-static configuration signal to one or more served UEs, wherein the semi-static configuration signal configures a plurality of available CBG granularities for acknowledgement feedback, to transmit, by the base station, control signaling to the one or more served UEs, wherein the control signaling is associated with a slot type of a current slot of a current TxOP, and to detect, by the base station, acknowledgement feedback from the one or more served UEs, wherein the acknowledgement feedback is detected in an acknowledgement format corresponding to the current CBG granularity.

In an additional aspect of the disclosure, an apparatus configured for wireless communication is disclosed. The apparatus includes at least one processor, and a memory coupled to the processor. The processor is configured to compute, by a base station, an effective set of acknowledgement values based on one or more acknowledgement values received corresponding to data transmissions in a reference slot of a current TxOP, to determine, by the base station, a transmission failure rate of the effective set of acknowledgement values, and to update, by the base station, a contention window size in response to a relative association between the transmission failure rate and a transmission failure threshold rate.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
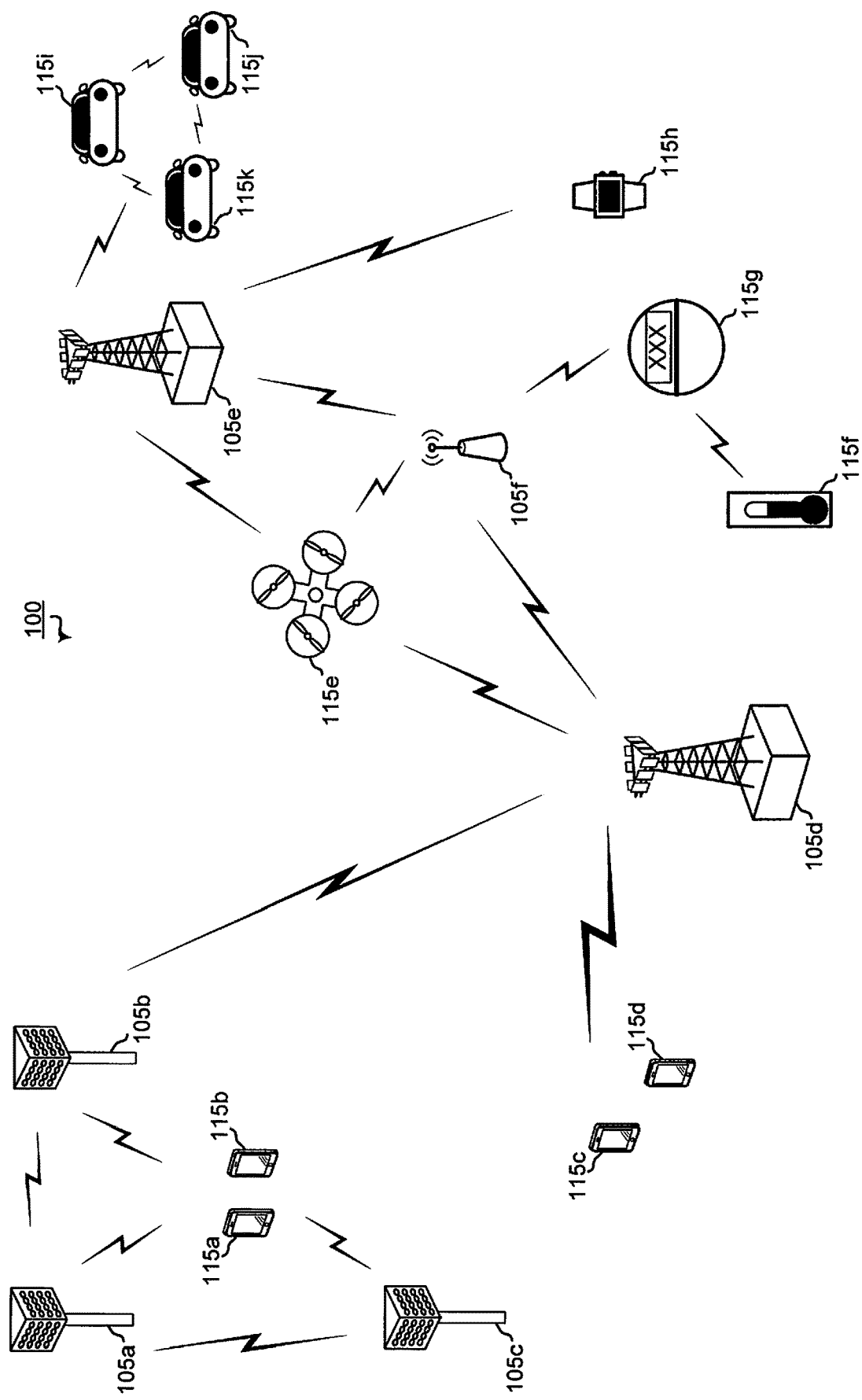
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA, UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., 99.9999% reliability), ultra-low latency (e.g., 1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries, 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or interact of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
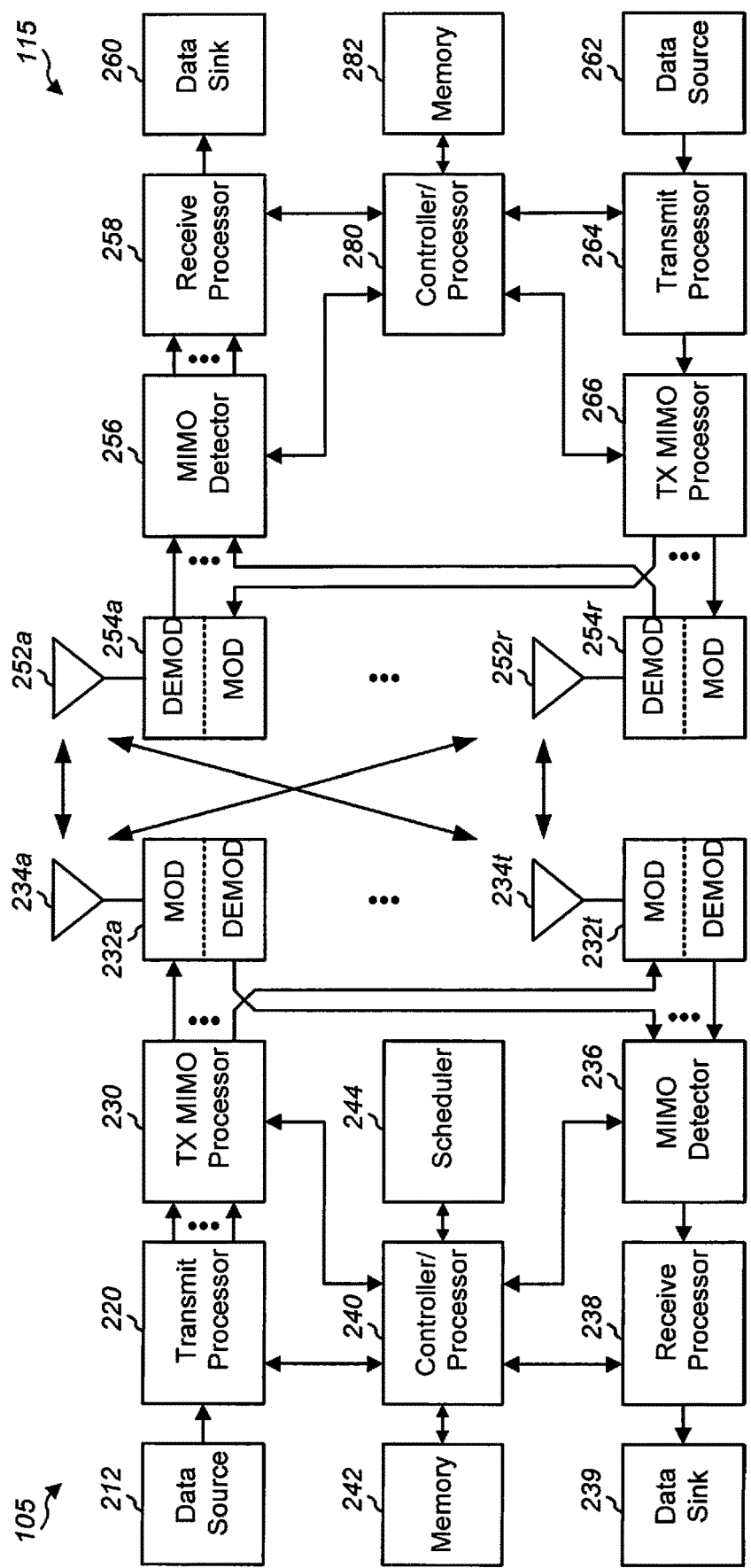
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODS) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5A, 5B, and 7, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5G network 100 (in FIG. 1) may operate in a shared radio frequency spectrum band, which may include licensed or unlicensed (e.g., conterition-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA may also include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and 115 of different network operating entities to contend for shared resources may result in increased signaling overhead and communication latency.

Figure 3:
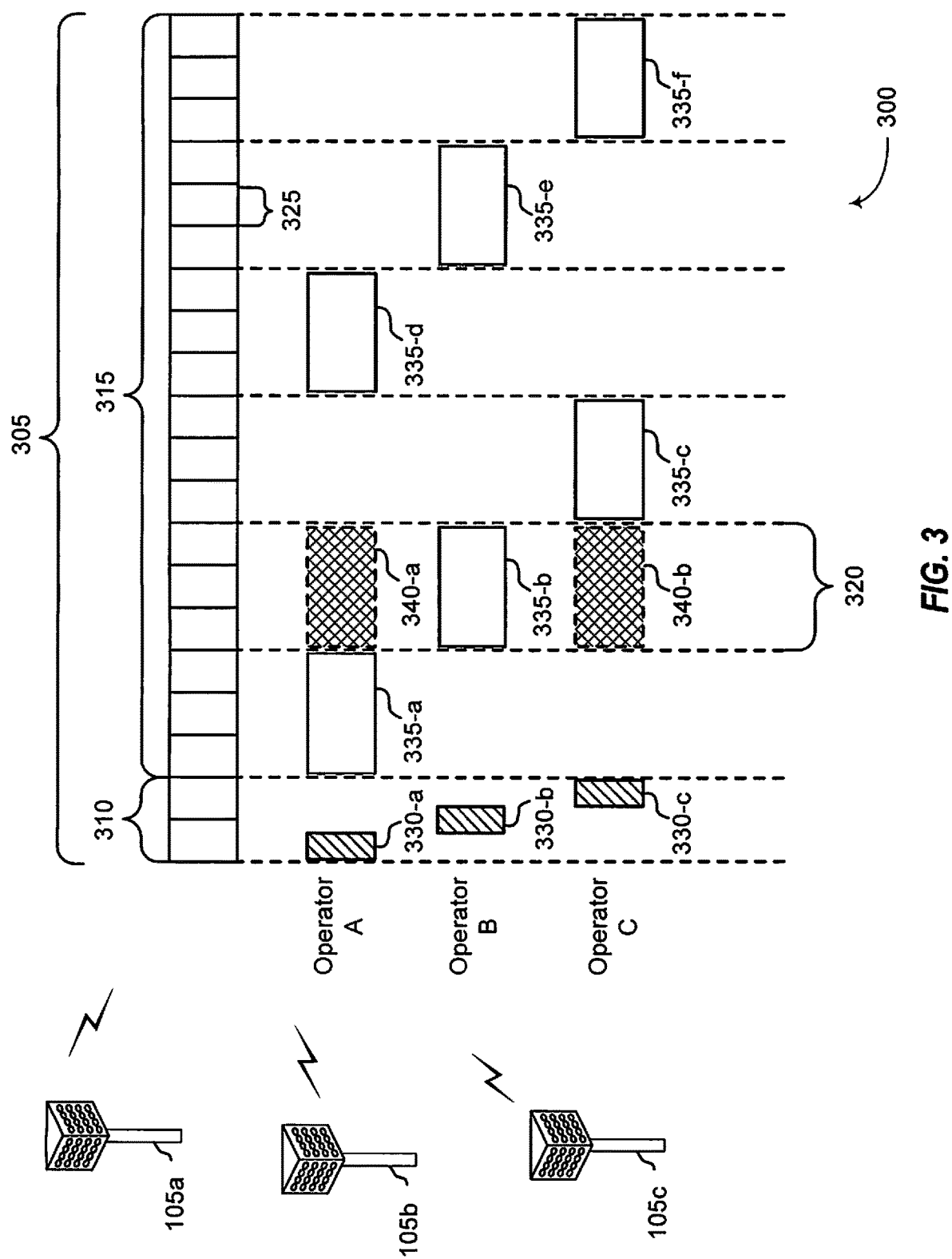
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). The superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-a may be reserved for exclusive communications by Operator A, such as through base station 105a, resources 330-b may be reserved for exclusive communications by Operator B, such as through base station 105b, and resources 330-c may be reserved for exclusive communications by Operator C, such as through base station 105c. Since the resources 330-a are reserved for exclusive communications by Operator A, neither Operator B nor Operator C can communicate during resources 330-a, even if Operator A chooses not to communicate during those resources. That is, access to exclusive resources is limited to the designated network operator. Similar restrictions apply to resources 330-b for Operator B and resources 330-c for Operator C. The wireless nodes of Operator A (e.g., UEs 115 or base stations 105) may communicate any information desired during their exclusive resources 330-a, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBS)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B (e.g., G-INT-OpB), resources 335-c (e.g., G-INT-OpC) may be prioritized for Operator C, resources 335-d may be prioritized for Operator A, resources 335-e may be prioritized for Operator B, and resources 335-f may be prioritized for Operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT (e.g., resources 335-b), Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously. For example, Operator A may have priority over Operator C during sub-interval 320 when Operator B is not using resources 335-b (e.g., G-INT-OpB). It is noted that in another sub-interval (not shown) Operator C may have priority over Operator A when Operator B is not using its G-INT.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-μs for 60 kHz tone spacing). These subframes 325 may be standalone, self-contained Interval-Cs (ITCs) or the subframes 325 may be a part of a long ITC. An ITC may be a self-contained transmission starting with a downlink transmission and ending with an uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within the superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of the superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Hybrid automatic repeat request (HARQ) feedback in access technologies, such as LTE, license assisted access (LAA), enhanced LAA (eLAA), muLTEfire (MF), and the like, is supported at a transport, block (TB) level granularity, where each acknowledgement (ACK) or negative acknowledgement (NACK) corresponds to each code block (CB) transmission included in the TB. In terms of time, TB-level granularity corresponds to one transmission timing interval (TTI) or one subframe. With the introduction of NR access technology, HARQ feedback may be supported on a code block group (CBG) level. The number of CBs per CBG is configurable in addition to the number of CBGs per TB. Thus, the granularity of HARQ feedback may also be configurable for all HARQ processes of a given configured downlink cell. A base station may configure the granularity of such HARQ processes via radio resource control (RRC) signaling.

In LTE, the HARQ feedback timeline is fixed at four slots. MF networks allow a variability to the HARQ timeline but are mainly limited by a 4 ms constraint and are not as configurable as NR and NR-U network operations. NR-U operations allow a variable HARQ timeline configured by a serving base station. The configurability of the CBG granularity along with the variability of the HARQ timeline introduce new challenges in NR-U operations.

Figure 4:
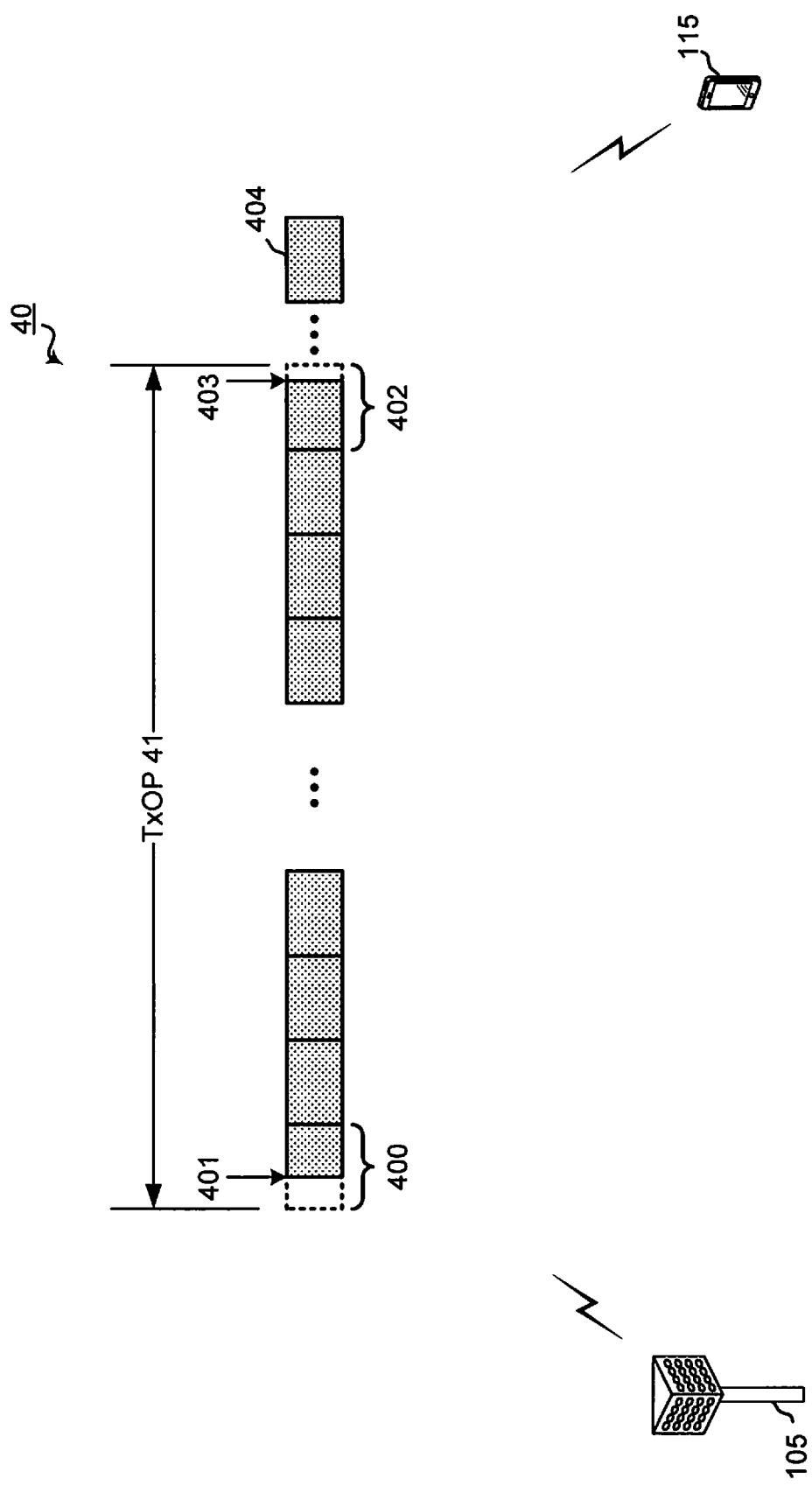
FIG. 4 is a block diagram illustrating a base station and UE in communications over NR-U network.

FIG. 4 is a block diagram illustrating base station 105 and UE 115 in communications over NR-U network 40. CBG-based feedback is useful for partial transmission slots. For example, base station 105 performs an LBT process to access shared communication spectrum for downlink transmissions to UE 115. Base station 105 performs an LBT procedure in initial slot 400 and detects success at 401. Base station 105 accesses the shared spectrum at any symbol when it passes LBT at 401 and may need to puncture or rate match to initial slot 400. CBG-based feedback allows UE 115 to report the CBGs which can pass decoding even with partial slot transmission of initial slot 400. Without CBG-based feedback, UE 115 would feedback a NACK for the entire initial slot 400 if any of the CBGs within initial slot 400 are not decoded, regardless of whether UE 115 fails to decode the transmitted CBG or base station 105 has not transmitted the CBG because it has not passed the LBT yet.

Similarly, ending slot 402 of TxOP 41 may be considered a partial slot because UE 115 may not have enough processing time to process the later CBGs of ending slot 402. Processing deadline 403 represents the last position in ending slot 402 where UE 115 will have sufficient time to decode and process the CBGs to include HARQ feedback at 404. The CBG-based feedback allows UE 115 to process earlier CBGs of ending slot 402 and send feedback based on the decoding results at 404, while the CBGs without enough turnaround time can be reported as NACK. Therefore, the degree of utility of CBG granularity may depend on the type of slot (e.g., a boundary slot—initial or ending partial slot—, or a non-boundary slot).

Figure 5:
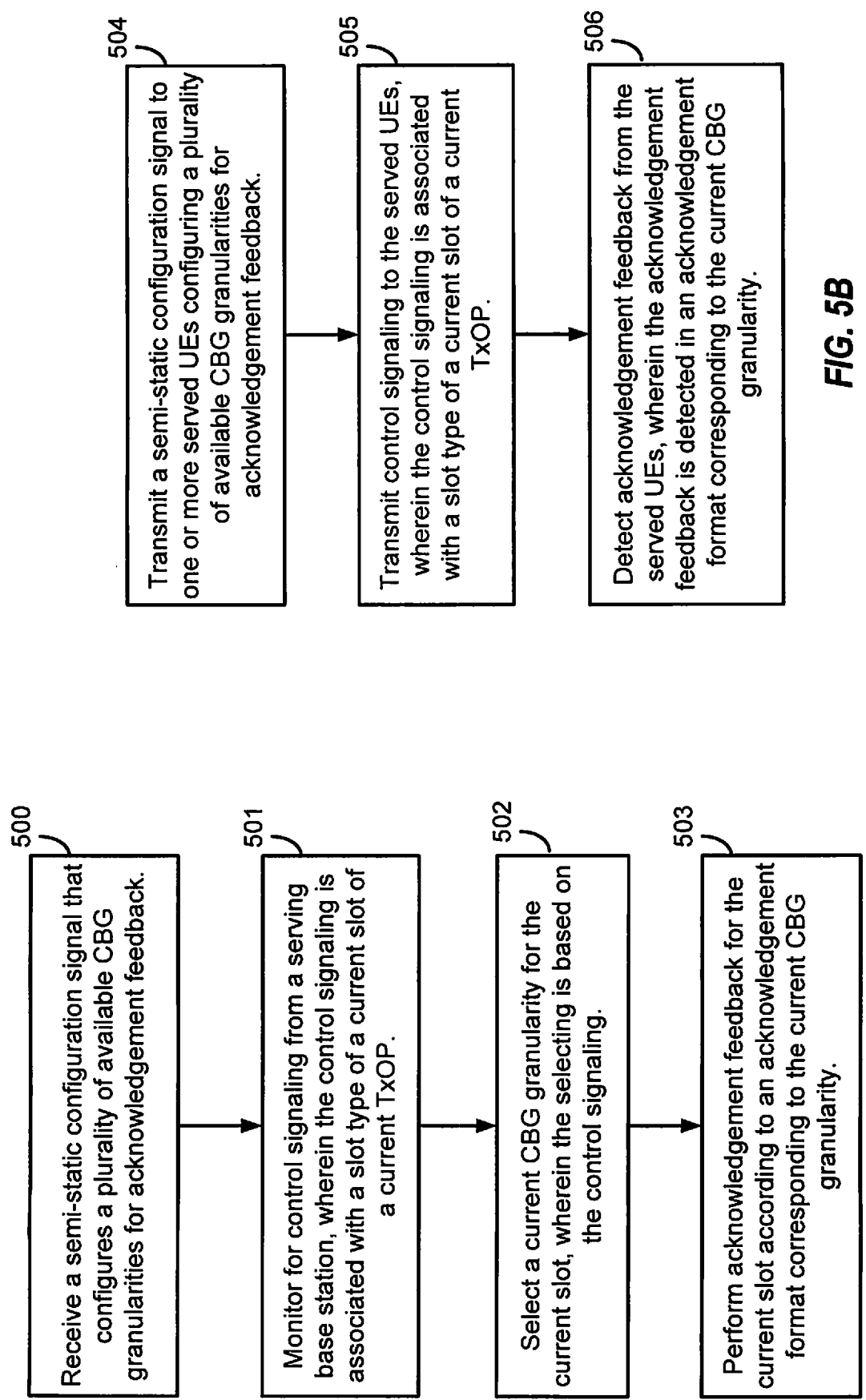
FIGS. 5A and 5B are block diagrams illustrating example blocks executed to implement aspects of the present disclosure.
Figure 10:
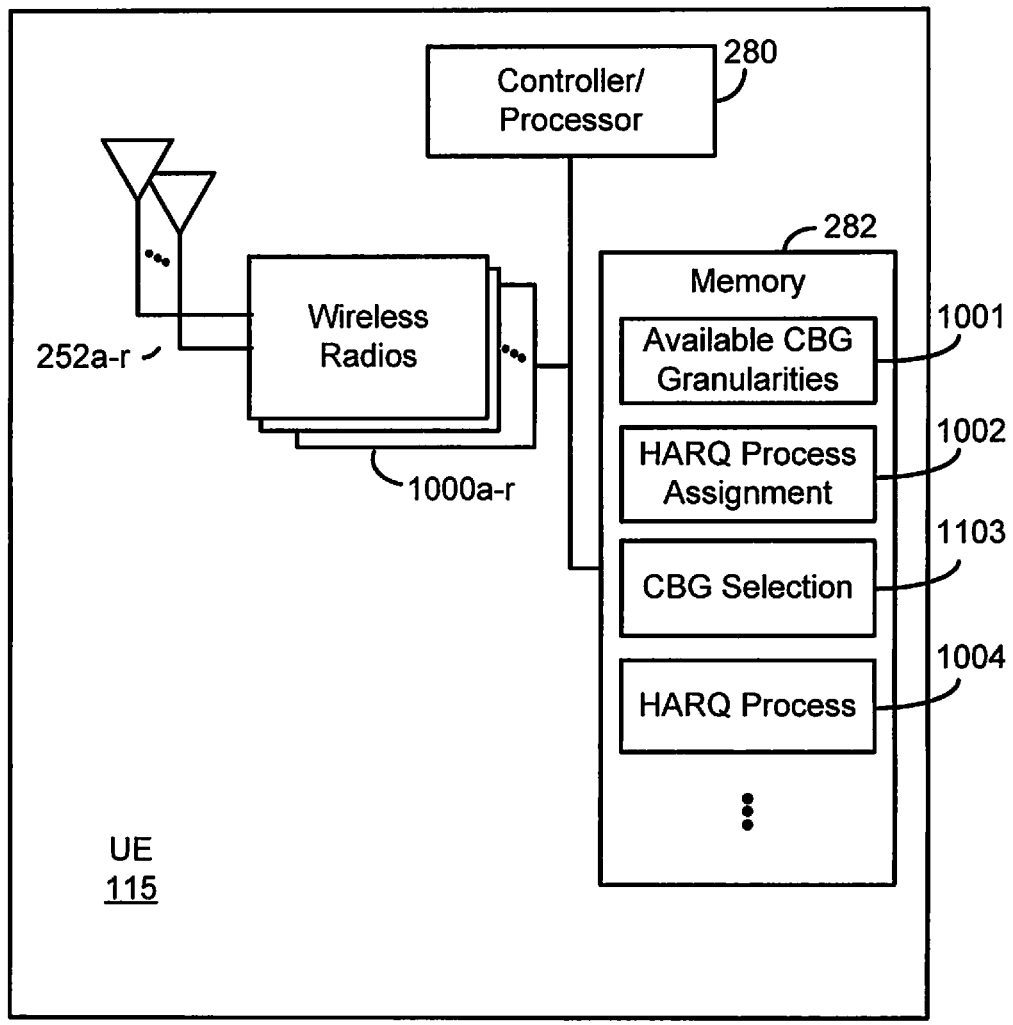
FIG. 10 is a block diagram illustrating an example UE configured according to aspects of the present disclosure.

FIGS. 5A and 5B are block diagrams illustrating example blocks executed to implement one aspect of the present disclosure. The example blocks will also be described with respect to UE 115 as illustrated in FIG. 10. FIG. 10 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1000a-r and antennas 252a-r. Wireless radios 1000a-r includes various components and hardware, as illustrated in FIG. 2 for UE 115, including modulator/demodulators 254a-r, MIMO detector 256, receive processor 258, transmit processor 264, and TX MIMO processor 266.

Figure 11:
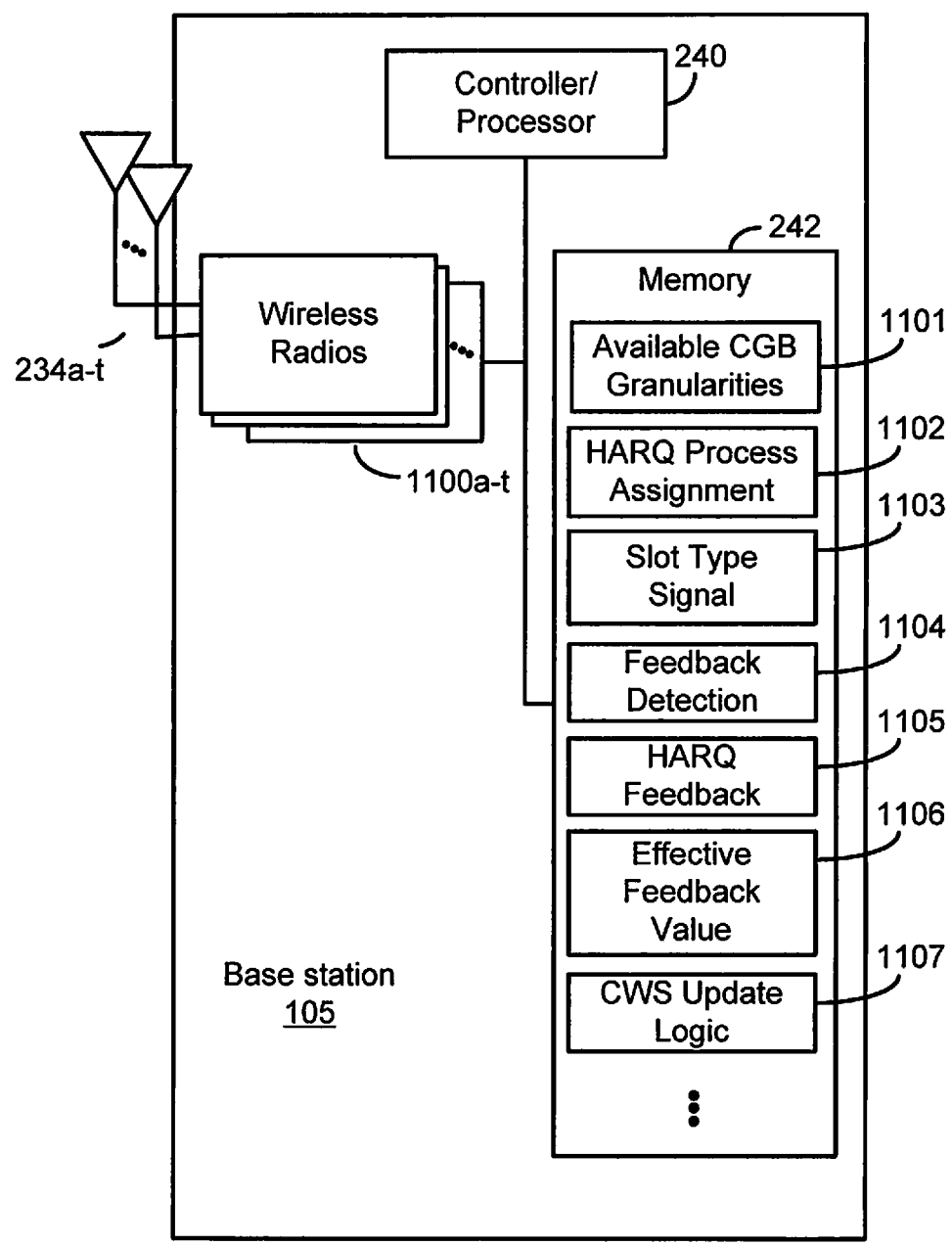
FIG. 11 is a block diagram illustrating an example base station configured according to aspects of the present disclosure.

The example blocks will also be described with respect to base station 105 as illustrated in FIG. 11. FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1100a-t and antennas 234a-t. Wireless radios 1100a-t includes various components and hardware, as illustrated in FIG. 2 for base station 105, including modulator/demodulators 232a-t, MIMO detector 236, receive processor 238, transmit processor 220, and TX MIMO processor 230.

At block 504, a base station transmits a semi-static configuration signal to one or more served UEs, wherein the semi-static configuration signal configures a plurality of available CBG granularities for acknowledgement feedback. For example a base station, such as base station 105, may determine the set of available CBG granularities by executing, under control of controller/processor 240, available CBG granularities logic 1101, in memory 242. The execution environment of available CBG granularities logic 1101, allows for base station 105 to determine the set of granularities and transmit them in a semi-static configuration signal via wireless radios 1100a-t and antennas 234a-t. The semi-static configuration signal may include, for example, RRC configuration signals. The semi-static configuration signal may also include HARQ process assignment 1102. The execution environment of HARQ process assignment 1102 pre-assigns the HARQ processes to particular CBG granularities. The execution environment of HARQ process assignment 1102 includes generation of the semi-static signal identifying the HARQ process ID to the particular CBG granularity.

At block 500, a UE receives the semi-static configuration signal, wherein the semi-static configuration signal configures a plurality of available CBG granularities for acknowledgement feedback. A UE, such as UE 115, may receive the semi-static configuration signals via antennas 252a-r and wireless radios 1000a-r and store in memory 282 at available CBG granularities 1001. The semi-static configuration signal, when received as a set of available CBG granularities may be stored by UE 115 in memory 282 at available CBG granularities 1001, and when received as a pre-assignment of HARQ process IDs to specific CBG granularities, it may be stored in memory 282 at HARQ process assignment 1002.

At block 505, the base station transmits control signaling to the one or more served UEs, wherein the control signaling is associated with a slot type of a current slot of a current TxOP. In order to identify the selection of a particular CBG granularity, base station 105, under control of controller/processor 240, executes slot type signaling logic 1103 in memory 242. The execution environment of slot type signaling logic 1103 provides for base station 105 to transmit signals that identify the type of slot for each slot in the current TxOP. For example, the signals may include a the GC-PDCCH, a dedicated slot type field, a bit or bits used in the DCI, and the like.

At block 501, the UE monitors for the control signaling from a serving base station, wherein the control signaling is associated with a slot type of a current slot of a current TxOP. UE 115 monitors for the slot type signaling via antennas 252*a-r* and wireless radios 1000*a-r*. In order to select a particular CBG granularity for acknowledgement feedback for the current slot, UE 115 will receive further signaling for use in selecting from available CBG granularities 1001.

At block 502, the UE selects a current CBG granularity from the plurality of available CBG granularities for the current slot of the current TxOP, wherein the selecting is based on the control signaling. When UE 115 receives the slot type signaling via antennas 252*a-r* and wireless radios 1000*a-r*, UE 115, under control of controller/processor 280, executes CBG selection logic 1103 stored in memory 282. The execution environment of CBG selection logic 1103 allows UE 115 to use the slot type to select a CBG granularity from available CBG granularities 1001. Where the slot type indicates a boundary slot, such as an initial slot or an ending slot, the CBG granularity selected may apply for al CBG based granularity for acknowledgement feedback. Otherwise, where a non-boundary slot is identifies, the CBG granularity selected may have another CBG-based granularity or a TB based granularity. For purposes of this disclosure, a boundary slot refers to either an initial slot or an ending slot of a TxOP. A non-boundary slot refers to a slot within a TxOP that is neither an initial slot or an ending slot.

At block 503, the UE performs the acknowledgement feedback for the current slot according to an acknowledgement format corresponding to the current CBG granularity. UE 115, under control of controller/processor 280, executes HARQ process 1004 in memory 282. The execution environment of HARQ process 1004 provides the acknowledgement feedback for the transmissions that are either received or not to the serving base station. UE 115 will transmit the acknowledgement information (e.g., ACK or NACK) via wireless radios 1000*a-r* and antennas 252*a-r*.

At block 506, the base station detects acknowledgement feedback from the one or more served UBs, wherein the acknowledgement feedback is detected in an acknowledgement format corresponding to the current CBG granularity. Once the slot type signals are transmitted, base station 105 executes feedback detection logic 1104, in memory 242. The execution environment of feedback detection logic 1104 allows base station 105 to monitor for any HARQ feedback via antennas 234*a-t* and wireless radios 1100*a-t*. When detected, base station 105, under control of controller/processor 240, executes HARQ feedback logic 1105. The execution environment of HARQ feedback logic 1105 allows base station 105 to use the HARQ feedback for various purposes, such as to adjust communication parameters, transmit power, and the like, in addition to, in NR-U networks, potentially adjust the contention window size.

Figure 6:
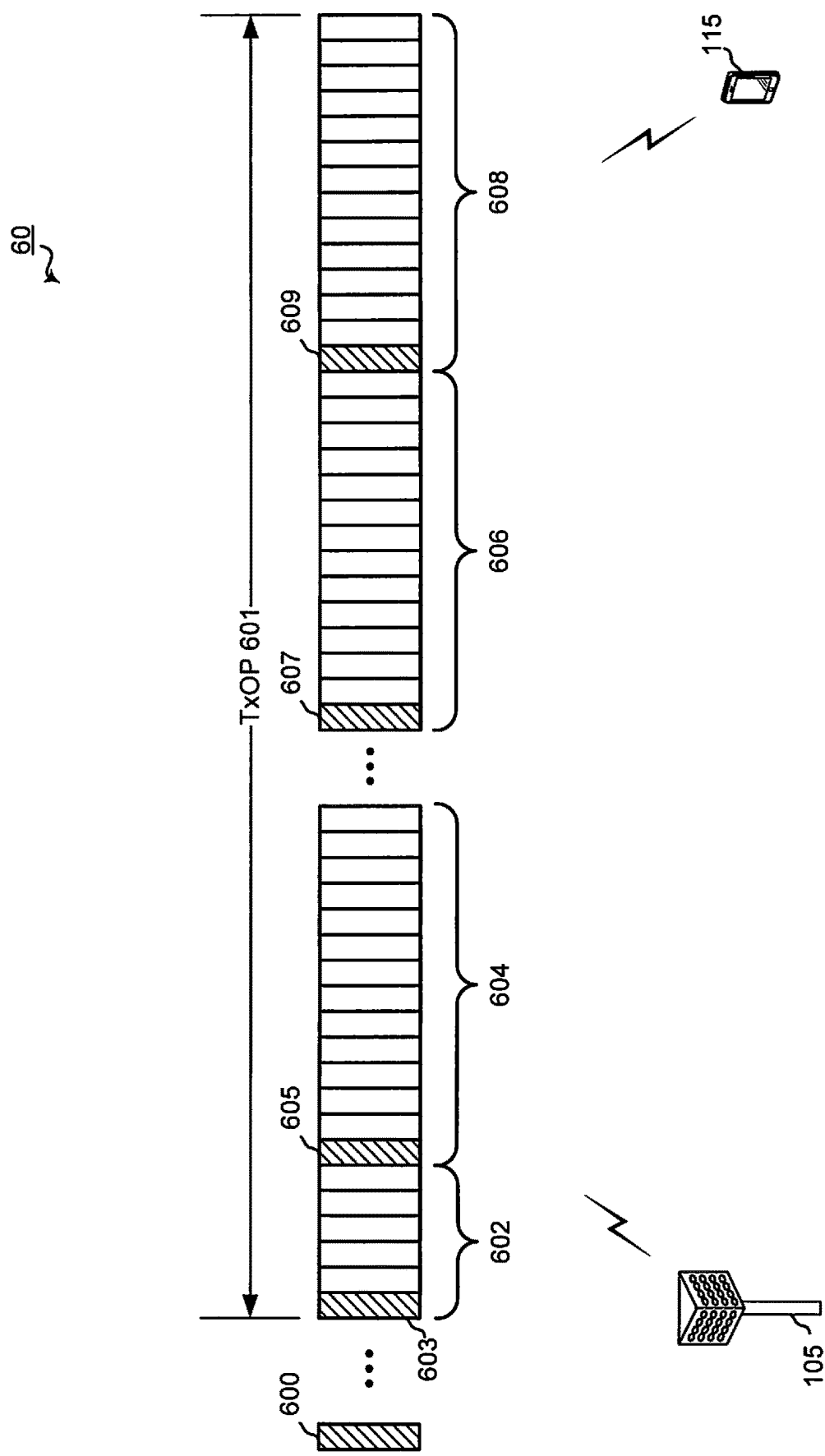
FIG. 6 is a block diagram illustrating an NR-U network including communications between a base station and UE, each configured according to one aspect of the present disclosure.

FIG. 6 is a block diagram illustrating NR-U network 60 including communications between base station 105 and UE 115, each configured according to one aspect of the present disclosure. According to the various aspects of the present disclosure, a time varying CBG granularity may be introduced, where different HARQ processes or different slots can have a different number of CBGs for HARQ ACK/NACK feedback instead of using a fixed CBG size for all HARQ processes over a given duration. Base station 105 transmits semi-static configuration message 600 to UE 115 indicating multiple available CBG granularities for HARQ feedback in TxOP 601. For example, semi-static configuration message 600 may include an RRC configuration message. UE 115 monitors for control signaling from base station 105 that indicates the start, slot 602, the end, slot 608, and/or, a slot type for the slots of TxOP 601. Base station 105 transmits control signaling 603, 605, 607, and 609 at each of slots 602, 604, 606, and 608, respectively, of TxOP 601. For example, control signaling 603, 605, 607, and 609 may comprise group common PDCCH (GC-PDCCH), used to indicate the frame structure of TxOP 601. Based on the slot type indicated in this signaling, UE 115 selects the CBG granularity from one of multiple configured values. Thus, where a boundary slot is indicated in the slot type indicator of control signaling 603, 605, 607, and 609, UE 115 may select the CBG granularity for partial slots.

According to various alternative aspects, control signaling 603, 605, 607, and 609 may include a field that identifies the slot type (e.g., boundary vs. non-boundary slot) in each of slots 602, 604, 606, and 608 of TxOP 601. In one example implementation, a first CBG granularity is associated with boundary slots. Thus, where the field identifies the current slot as a boundary slot, UE 115 selects the first CBG granularity for formatting HARQ ACK/NACK feedback. Where the field identifies the current slot as a non-boundary slot, UE 115 selects a second CBG granularity. Control signaling 603, 605, 607, and 609 may further be implemented using a downlink control information (DCI) message indicating which one of the multiple available CBG granularities UE 115 may select to format the HARQ feedback.

It should be noted that the slot type may be broadcast by base station 105 and the designation of the first and second CBG granularities may be configured as UE-specific.

According to additional aspects of the present disclosure, where UE 115 fails to detect or decode control signaling 603, UE 115 may be configured to select a fallback CBG granularity from the multiple available CBG granularities. On the base station side, base station 105 may perform blind detection of the HARQ feedback from UE 115 to determine the CBG granularities when multiple hypotheses exist.

The blocks of FIG. 6 may further illustrate an additional aspect of the present disclosure. Semi-static configuration message 600 may alternatively include a pre-assigned set of HARQ process IDs corresponding to a CBG granularity. For purposes of the described additional aspect, a number of HARQ processes (e.g., 4, 6, 8, etc.) may be configured for UE 115. Base station 105 may pre-assign the HARQ processes to specific CBG granularities. For example, base station 105 pre-assigns a first set of HARQ process identifiers (IDs) to a first CBG granularity applicable to boundary slots, while a second set of HARQ process IDs are pre-assigned to a second CBG granularity applicable to non-boundary slots. Semi-static configuration message 600 includes the pre-assignments of the different HARQ process IDs to the corresponding CBG granularity. The grants (e.g., control signaling 603, 605, 607, and 609) transmitted by base station 105 can still be based on the maximum number of CBGs for UE 115 to monitor downlink control. However, as UE 115 reads the HARQ process ID of the grant, it will select the corresponding CBG granularity identified in the pre-assignment of semi-static configuration message 600.

In LAA, eLAA, and MF networks, a base station, or a UE in the case of autonomous uplink, will contend to access the shared communication medium. The length of time that the transmitting node monitors the medium is determined by a contention window size (CWS). A CWS represents the maximum range within which a random number of contention slots is chosen and may be updated based on a transmission failure rate observed in HARQ ACK/NACK feedback from the UE. The rules for CWS adjustment in LAA, eLAA, and MF network are generally based on concepts specific to LTE and, hence, may not apply with clarifications when translated to NR or NR-U network operations.

In particular, the variable CBG granularity, as noted above, may not be compatible with the LAA, eLAA, or MF network CWS adjustment rules that operate as a function of transport block level HARQ ACK/NACK feedback. With the introduction of CBG-level HARQ ACK/NACK feedback in NR and NR-U network operations, modifications may be implemented to process a set of CBG level ACK/NACK messages to trigger updating the CWS. HARQ-ACK feedback may be even more granular in the frequency domain with transmissions spanning multiple listen before talk (LBT) subbands (e.g., NR-U networks may include the concept of 20 MHz subband-based LBT operations). Additionally, the HARQ timeline between transmission and ACK/NACK in NR-U offers more flexibility and may not be a constant value, depending on configuration. This would also affects how the CWS may be updated.

Figure 7:
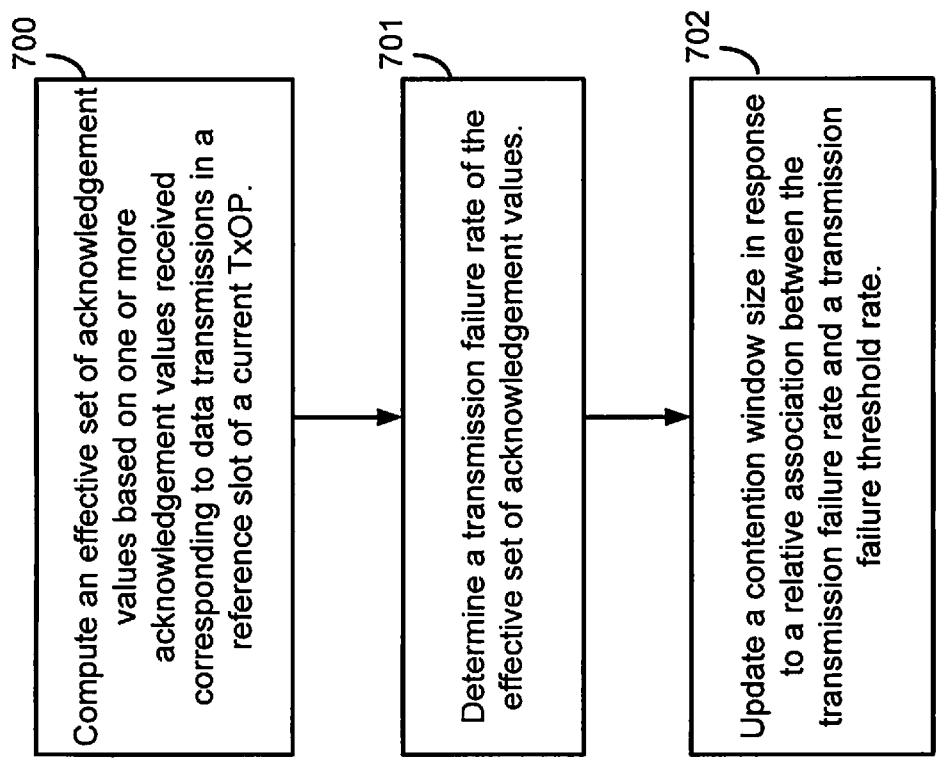
FIG. 7 is a block diagram illustrating example blocks executed to implement one aspect of the present disclosure.

FIG. 7 is a block diagram illustrating example blocks executed to implement one aspect of the present disclosure. The example blocks will also be described with respect to base station 105 as illustrated in FIG. 11.

At block 700, a base station computes an effective set of acknowledgement values based on one or more acknowledgement values received corresponding to data transmissions in a reference slot of a current TxOP. As base station 105 receives the HARQ feedback from served UEs via antennas 234a-t and wireless radios 1100a-t, base station 105 executes, under control of controller/processor 240, effective feedback value logic 1106 in memory 242. The execution environment of effective feedback value logic 1106 provides for base station 105 to compute the effective HARQ feedback value that accounts for the variability of CBG granularities over the current TxOP.

At block 701, the base station determines a transmission failure rate of the effective set of acknowledgement values. When base station 105 computes the effective HARQ feedback value, it executes, under control of controller/processor 240, CWS update logic 1107. The execution environment of CWS update logic 1107 provides the functionality of base station 105 to determine the failure rate of the effective HARQ feedback value and compare that rate against a threshold transmission failure rate. Where the current failure rate of the effective HARQ feedback value exceeds the threshold rate, a determination is made to update the CWS for the next contention window.

At block 702, the base station updates a contention window size in response to a relative association between the transmission failure rate and a transmission failure threshold rate. When the determination is made in block 701 to update the CWS, base station 105, under control of controller/processor 240 will update the CWS within the execution environment of CWS update logic 1107. The CWS may be increased gradually to a maximum size over time as the failure rate continues to exceed the threshold. Conversely, where the current failure rate meets the threshold rate, base station 105 may determine to decrease or at least maintain the current CWS. If the current failure rate continues to meet the threshold failure rate, base station 105 may continue to decrease the CWS to the minimum size.

Figure 8A:
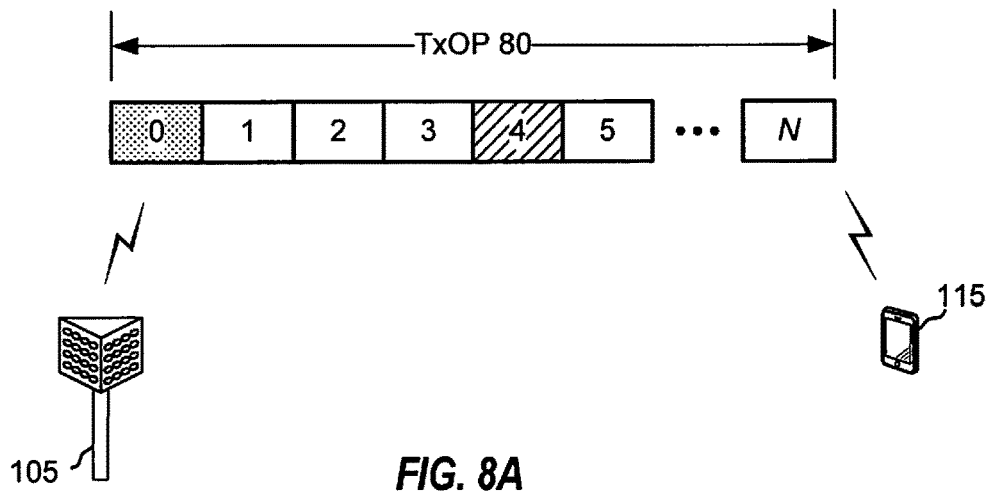
FIGS. 8A-8C are block diagrams illustrating NR-U communications between a base station and UE configured according to aspects of the present disclosure.
Figure 8B:
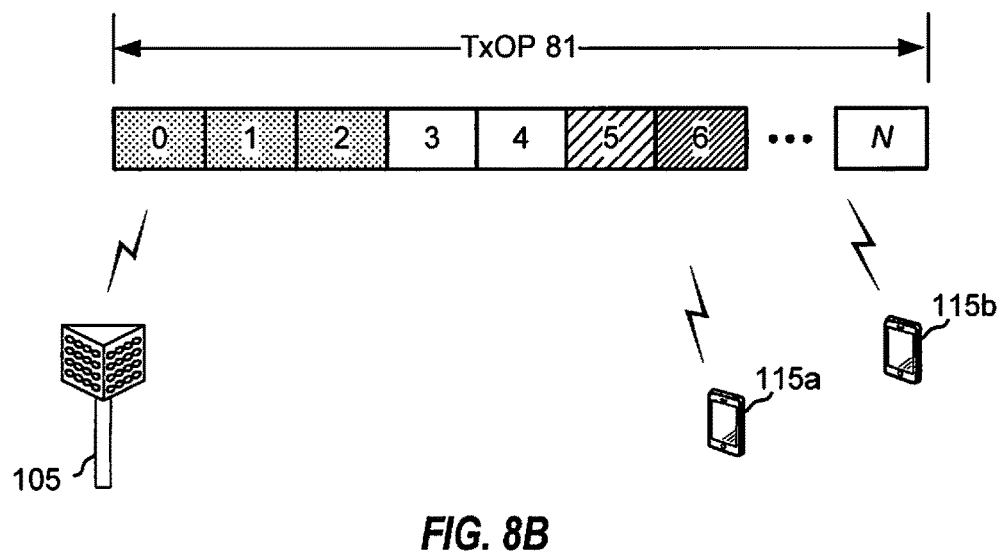
Figure 8C:
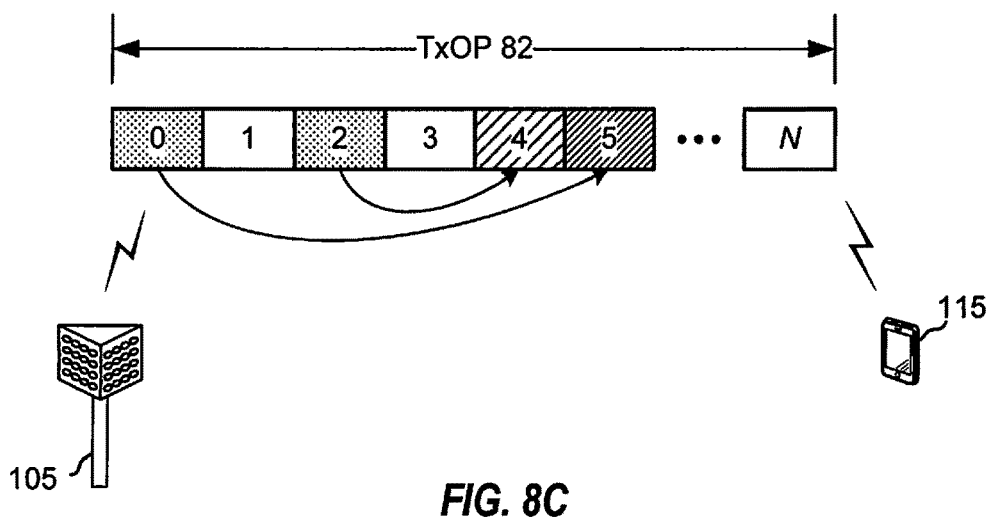

FIGS. 8A-8C are block diagrams illustrating NR-U communications between a base station 105 and UE 115 configured according to aspects of the present disclosure. Within the context of existing CWS update procedures, such as in LAA networks, and the variable CBG granularity described above, if at least 80% of the HARQ feedback values corresponding to transmission(s) in a reference slot are determined as NACK, increase the CWS for every priority class. The HARQ ACK/NACK feedback may be formatted based on a different granularity (e.g., TB-based or CBG-based). If, on the reference slot, one of the transmissions (e.g., PDSCH) is acknowledged at different CBG granularities (including at TB-based granularity HARQ, as one possibility), there may be multiple solutions for CWS adjustment to use in aspects of the present disclosure. Base station 105 may compute an effective HARQ ACK/NACK value that takes into consideration of the varying CBG granularity supported by NR-U and supporting modified HARQ ACK/NACK feedback.

In a first example aspect, HARQ-ACK feedback can be weighted equally regardless of CBG granularity. In such implementations, each ACK-NACK counts the same, regardless of whether it represents a TB-based HARQ feedback or CBG-level HARQ feedback. For example, at FIG. 8A, base station 105 transmits to UE 115 at slot 0 of TxOP 80. The HARQ ACK-NACK feedback for this transmission at slot 0 is expected from UE 115 at slot 4. Because of the CBG granularity, there are ACK-NACK for TB-based HARQ feedback and for CBG-based HARQ feedback at slot 4 of TxOP 80. In such aspects, all ACK-NACKs count the same.

In a second alternative aspect, all HARQ ACK-NACK feedback can be weighted considering the number of CBGs. Using the example scenario above with one TB-based HARQ feedback and one CBG-based HARQ feedback, for each TB defined and configured for transmission at slot 4, there are a number of CBGs that comprise the TB. The effective HARQ ACK/NACK value, therefore, may accommodate the one-to-one number of CBGs of the CBG-based HARQ feedback and the number of CBGs included within the TB-based HARQ feedback. Considering an example configuration in which each TB includes four CBGs, the effective HARQ ACK/NACK includes four CBG-based HARQ ACK-NACK values from the TB-based feedback and another CBG-based feedback.

In a third alternative aspect, the HARQ-ACK feedback can also be weighted considering the number of CBs for each CBG. Here, with reference to FIG. 8B, different users, such as UE 115a and 115b, may have different numbers of CBs assigned per CBG. Thus, the varied level of CBG-based HARQ feedback may accommodate various users 115a and 115b having different numbers of CB assigned to the CBG granularity. In one example implementation, UE 115a is configured to have three CBs per CBG, while UE 115b is configured to have two CBs per CBG. During HARQ ACK/NACK feedback at slot 5 of TxOP 81, the effective HARQ ACK/NACK value includes the ACK/NACK from UE 115a, covering three CBs of transmissions from base station 105, and the ACK/NACK from UE 115b covering two CBs of transmissions from base station 105.

In existing network operations, such as with the LAA networks, the CWS updating rules define a reference slot as the starting slot of the most recent TxOP on the carrier made by the transmitting base station, for which at least some HARQ ACK/NACK feedback is expected to be available. In NR-U operations, the reference slot may also be defined as the first slot of the most recent TxOP, essentially adopting the CWS updating rules of LAA networks. In NR-U operations, however, the HARQ timelines are configurable and, hence, also variable. For instance, a UE scheduled on a second slot of a TxOP may send its HARQ feedback earlier than another UE scheduled on the first slot of the same TxOP.

FIG. 8A illustrates an example aspect of NR-U operations in which the first slot, slot 0, is defined as the reference slot for which any available HARQ-ACK may be used to determine CWS updates. For example, base station 105 transmits during slot 0, the reference slot. Base station 105 may then expect to receive HARQ ACK/NACK feedback from UE 115 at slot 4. When such HARQ feedback is received by base station 105, base station 105 computes the effective HARQ ACK/NACK value, and determines whether the actual transmission failure rate identified in the effective HARQ ACK/NACK value meets or exceeds a transmissions failure threshold. When the threshold is exceeded, base station 105 will gradually increase the CWS capped by a maximum window size, while if the threshold is met, base station 105 may similarly gradually decrease the CWS capped by a minimum window size.

FIG. 8B illustrates a second example aspect of NR-U operations in which the reference slot is defined as any of the first K slots for which any HARQ ACK/NACK feedback is available for CWS update. Thus, in operation of the described second example aspect, base station 105 may use the first available HARQ ACK/NACK feedback received, at slot 5, in response to any transmissions over slots 0-2, to compute the effective HARQ ACK/NACK value for evaluating an update to the CWS. For example, base station 105 transmits downlink data to UE 115a at slot 0 and transmits downlink data to UE 11 at slot 2. The HARQ ACK/NACK feedback received at slot 5 represents the HARQ feedback transmitted by UE 115b. Base station 105 uses that HARQ feedback to compute the effective HARQ ACK/NACK value for evaluating CWS updates.

FIG. 8C illustrates a third example aspect of NR-U operations in which base station 105 may select a reference slot (even if it is not the first in a slot) based on the transmission slot for the HARQ feedback that becomes available first. For example, base station 105 transmits control signals to UE 115 at slot 0 and transmits downlink data signals to UE 115 at slot 2, HARQ ACK/NACK feedback is received by base station 105 from UE 115 in slot 4 for the transmissions in slot 2. Base station 105 may then determine that slot 2 is the reference slot and compute the effective HARQ ACK/NACK value based on the feedback received from UE 115 at slot 4. Even though the control transmissions from base station 105 were transmitted in the first slot of TxOP 82, slot 0, its HARQ feedback was not scheduled or not ready for transmissions (whether due to processing or performing a successful LBT procedure) until slot 5.

In NR-U network operations, for multiple transmissions on a given reference slot, the HARQ feedback timelines may be quite different. For example, the HARQ ACK/NACK feedback for two different PDSCH transmissions on the same reference slot may become available at different times. Referring back to FIG. 8B, in another example aspect, base station 105 may transmit downlink signals to UEs 115a and 115b at slot 1. Based on scheduling and ability to grab access to the shared communication medium, UE 115b is able to transmit HARQ feedback at slot 5, while UE 115a is able to transmit HARQ feedback at slot 6. The current rules for CWS updating provide that the base station 105 shall adjust the value of the CWS for every priority class based on a given reference slot only once. According to additional aspects of the present disclosure, an alternative rule may provide for base station 105 to adjust the value of the CWS for every priority class based on a given HARQ ACK/NACK feedback only once. Depending on the aspect implemented, base station 105 may elect to follow the existing rule connected to the identified reference signal or to follow the new rule connected to the HARQ feedback. When electing to use the current rule, base station 105 may wait to receive all HARQ feedback on slots 5 and 6 associated with the multiple transmissions on slot 1 for determining CWS updates. When electing to use the new rule, base station 105 may proceed with determining whether to update CWS based on the HARQ ACK/NACK feedback on slot 5 only.

Figure 9:
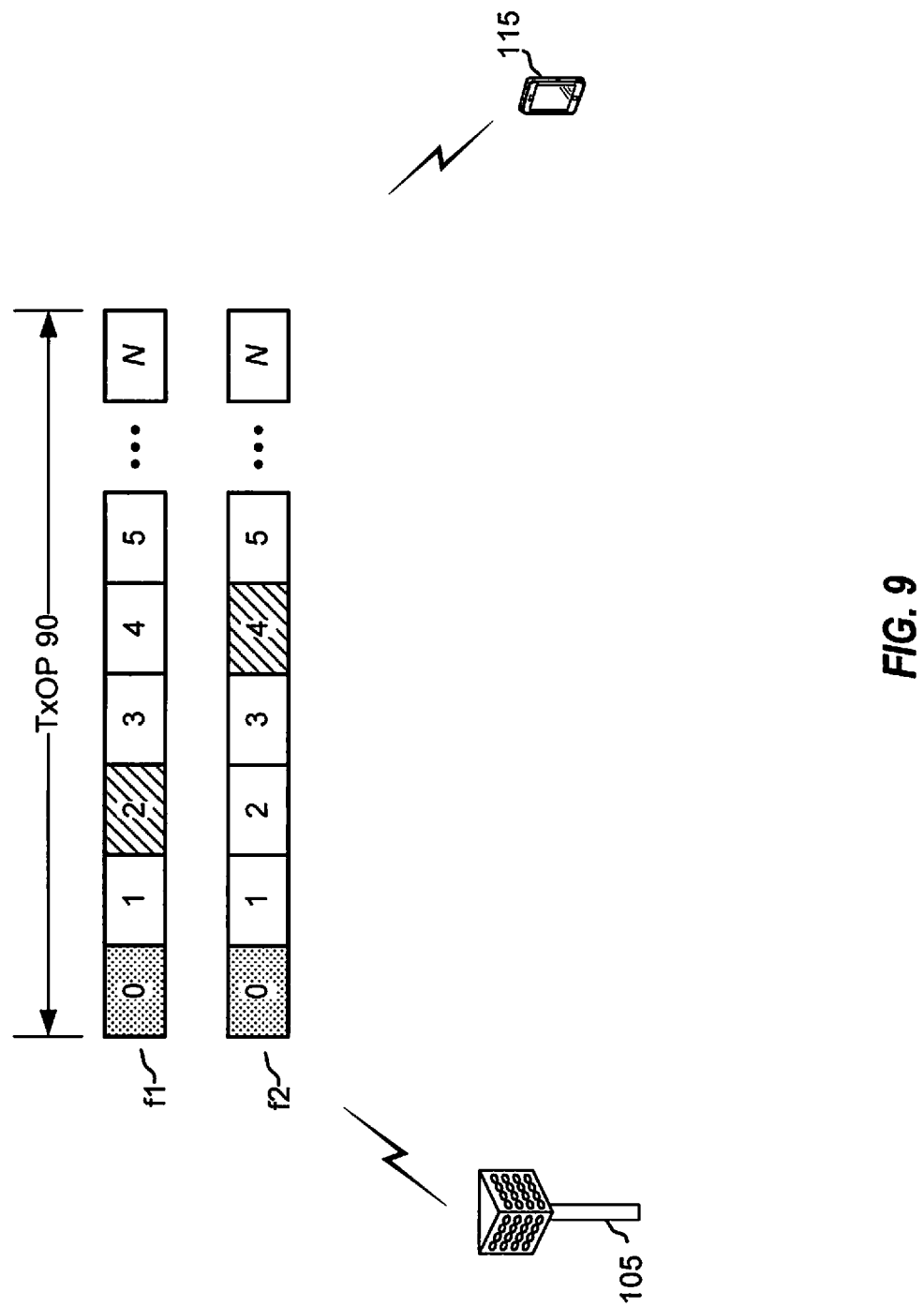
FIG. 9 is a block diagram illustrating communications in an NR-U network between a base station and UE, configured according to one aspect of the present disclosure.

FIG. 9 is a block diagram illustrating communications in an NR-U network between base station 105 and UE 115, configured according to one aspect of the present disclosure. Within the NR-U operations, while channel bandwidth may be up to 100 MHz, in order to accommodate potentially interfering WiFi and other entities competing for access to the shared communication channel, the LBT procedures may be provided in lower bandwidth subbands of the full channel bandwidth or larger bandwidth part (BWP) used for communications. For example, communications may be provided over 20 MHz LBT subbands that are independently secured by their own LBT procedures. When PDSCH transmissions are contained within a single LBT subband, then the HARQ ACK/NACK feedback may be used to update the CWS within that subband.

As illustrated in FIG. 9, however, a downlink data transmission (e.g., PDSCH) in slot 0 of TxOP 90 spans multiple subbands, frequency one (f1) and frequency two (f2). According to the illustrated example scenario, based on the downlink transmissions in slot 0 from base station 105 to UE 115, CBG HARQ feedback for f1 is transmitted by UE 115 at slot 2 on f1, while CBG HARQ feedback for 12 may not be transmitted by UE 115 until slot 4 on f2. Thus, according to aspects of the present disclosure, where a transmission spans, as here, multiple LBT subbands (f1 and f2), and particular CBG HARQ feedback received at slot 2 corresponds only to CB(s) spanning f1, then the CWS may be updated in one of two alternative ways. In a first alternative aspect, the CWS may be updated using the partial subset of CBG HARQ feedback that are available to base station 105 at slot 2 on f1 and discard the others that would be received at slot 4 on f2. In a second alternative aspect, base station 105 may delay CWS update until all the CBGs corresponding to the reference slot, slot 0, are available at slot 4 on f2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A, 5E, and 7 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality.

Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a user equipment (UE), a semi-static configuration signal, wherein the semi-static configuration signal configures a plurality of available code block group (CBG) granularities for acknowledgement feedback;
   monitoring, by the UE, for control signaling from a serving base station, wherein the control signaling is associated with a slot type of a current slot of a current transmission opportunity (TxOP);
   selecting, by the UE in response to detection of the control signaling, a current CBG granularity from the plurality of available CBG granularities for the current slot of the current TxOP, wherein the selecting is based on the control signaling, wherein each CBG granularity of the plurality of available CBG granularities defines a size of a respective CBG granularity such that the current slot includes one of: a first number of CBGs when the selected current CBG granularity is a first granularity, or a second number of CBGs when the selected current CBG granularity is a second granularity different from the first granularity, the second number of CBGs different from the first number of CBGs; and
   performing, by the UE, the acknowledgement feedback for the current slot according to an acknowledgement format corresponding to the current CBG granularity to the serving base station.

2. The method of claim 1, wherein the control signaling includes a slot identification signal identifying the slot type of each slot of the current TxOP.

3. The method of claim 2, wherein the slot identification signal includes one of:
   a field in each slot of the TxOP identifying a corresponding slot of the TxOP as one of: a boundary slot, or a non-boundary slot, wherein at least one CBG granularities is associated with the boundary slot and at least one other CBG granularity is associated with the non-boundary slot; or a downlink control indicator field identifying the current CBG granularity.

4. The method of claim 2, further including:
selecting, by the UE, a fallback CBG granularity of the plurality of available CBG granularities in response to a failure to detect the slot identification signal, wherein the acknowledgement feedback is performed for the current slot in accordance with a fallback acknowledgement format corresponding to the fallback CBG granularity.

5. The method of claim 1, wherein the semi-static configuration signal includes an acknowledgement configuration message, wherein the acknowledgement configuration message associates each of a plurality of acknowledgement process identifiers with a corresponding CBG granularity.

6. A method of wireless communication, comprising:
transmitting, by a base station, a semi-static configuration signal to one or more served user equipments (UEs), wherein the semi-static configuration signal configures a plurality of available code block group (CBG) granularities for acknowledgement feedback;
transmitting, by the base station, control signaling to the one or more served UEs, wherein the control signaling is associated with a slot type of a current slot of a current transmission opportunity (TxOP), wherein each CBG granularity of the plurality of available CBG granularities defines a size of a respective CBG granularity such that the current slot includes one of: a first number of CBGs when a current CBG granularity is a first granularity, or a second number of CBGs when the current CBG granularity is a second granularity different from the first granularity, the second number of CBGs different from the first number of CBGs; and
detecting, by the base station, acknowledgement feedback from the one or more served UEs, wherein the acknowledgement feedback is detected in an acknowledgement format corresponding to the current CBG granularity.

7. The method of claim 6, wherein the control signaling includes a slot identification signal identifying the slot type of each slot of the current TxOP.

8. The method of claim 7, wherein the slot identification signal includes one of:
a field in each slot of the TxOP identifying a corresponding slot of the TxOP as one of: a boundary slot, or a non-boundary slot, wherein at least one CBG granularities is associated with the boundary slot and at least one other CBG granularity is associated with the non-boundary slot; or
a downlink control indicator field identifying the current CBG granularity.

9. The method of claim 7, wherein the detecting includes:
blindly detecting, the acknowledgement format of the acknowledgement feedback, wherein the acknowledgement format corresponds to the current CBG granularity.

10. The method of claim 6, wherein the semi-static configuration signal includes an acknowledgement configuration message, wherein the acknowledgement configuration message associates each of a plurality of acknowledgement process identifiers with a corresponding CBG granularity.

11. An apparatus configured for wireless communication, the apparatus comprising:
at least one processor; and
a memory coupled to the at least one processor,
wherein the at least one processor is configured:
to receive, by a user equipment (UE), a semi-static configuration signal, wherein the semi-static configuration signal configures a plurality of available code block group (CBG) granularities for acknowledgement feedback;
to monitor, by the UE, for control signaling from a serving base station, wherein the control signaling is associated with a slot type of a current slot of a current transmission opportunity (TxOP);
to select, by the UE in response to detection of the control signaling, a current CBG granularity from the plurality of available CBG granularities for the current slot of the current TxOP, wherein the configuration of the at least one processor to select is executed based on the control signaling, wherein each CBG granularity of the plurality of available CBG granularities defines a size of a respective CBG granularity such that the current slot includes one of: a first number of CBGs when the selected current CBG granularity is a first granularity, or a second number of CBGs when the selected current CBG granularity is a second granularity different from the first granularity, the second number of CBGs different from the first number of CBGs; and
to perform, by the UE, the acknowledgement feedback for the current slot according to an acknowledgement format corresponding to the current CBG granularity.

12. The apparatus of claim 11, wherein the control signaling includes a slot identification signal identifying the slot type of each slot of the current TxOP.

13. The apparatus of claim 12, wherein the slot identification signal includes one of:
a field in each slot of the TxOP identifying a corresponding slot of the TxOP as one of: a boundary slot, or a non-boundary slot, wherein at least one CBG granularities is associated with the boundary slot and at least one other CBG granularity is associated with the non-boundary slot; or
a downlink control indicator field identifying the current CBG granularity.

14. The apparatus of claim 12, further including configuration of the at least one processor to select, by the UE, a fallback CBG granularity of the plurality of available CBG granularities in response to a failure to detect the slot identification signal, wherein the acknowledgement feedback is performed for the current slot in accordance with a fallback acknowledgement format corresponding to the fallback CBG granularity.

15. The apparatus of claim 11, wherein the semi-static configuration signal includes an acknowledgement configuration message, wherein the acknowledgement configuration message associates each of a plurality of acknowledgement process identifiers with a corresponding CBG granularity.

16. An apparatus configured for wireless communication, the apparatus comprising:
at least one processor; and
a memory coupled to the at least one processor,
wherein the at least one processor is configured:
to transmit, by a base station, a semi-static configuration signal to one or more served user equipments (UEs), wherein the semi-static configuration signal configures a plurality of available code block group (CBG) granularities for acknowledgement feedback;

to transmit, by the base station, control signaling to the one or more served UEs, wherein the control signaling is associated with a slot type of a current slot of a current transmission opportunity (TxOP), wherein each CBG granularity of the plurality of available CBG granularities defines a size of a respective CBG granularity such that the current slot includes one of: a first number of CBGs when a current CBG granularity is a first granularity, or a second number of CBGs when the current CBG granularity is a second granularity different from the first granularity, the second number of CBGs different from the first number of CBGs; and to detect, by the base station, acknowledgement feedback from the one or more served UEs, wherein the acknowledgement feedback is detected in an acknowledgement format corresponding to the current CBG granularity.

17. The apparatus of claim 16, wherein the control signaling includes a slot identification signal identifying the slot type of each slot of the current TxOP.

18. The apparatus of claim 17, wherein the slot identification signal includes one of:

a field in each slot of the TxOP identifying a corresponding slot of the TxOP as one of: a boundary slot, or a non-boundary slot, wherein at least one CBG granularities is associated with the boundary slot and at least one other CBG granularity is associated with the non-boundary slot; or a downlink control indicator field identifying the current CBG granularity.

19. The apparatus of claim 17, wherein the configuration of the at least one processor to detect includes configuration to blindly detect, the acknowledgement format of the acknowledgement feedback, wherein the acknowledgement format corresponds to the current CBG granularity.

20. The apparatus of claim 16, wherein the semi-static configuration signal includes an acknowledgement configuration message, wherein the acknowledgement configuration message associates each of a plurality of acknowledgement process identifiers with a corresponding CBG granularity.

* * * * *